W. J. STEWART & J. D. McKINNON.
CENTER BEARING FOR CARS.
APPLICATION FILED MAY 31, 1910.

990,308.

Patented Apr. 25, 1911.

WITNESSES

INVENTORS
W. J. STEWART
J. D. McKINNON

BY

ATT'Y.

UNITED STATES PATENT OFFICE.

WILLIAM JOHN STEWART AND JOHN DANIEL McKINNON, OF INVERNESS, NOVA SCOTIA, CANADA.

CENTER-BEARING FOR CARS.

990,308.  Specification of Letters Patent.  Patented Apr. 25, 1911.

Application filed May 31, 1910. Serial No. 564,307.

*To all whom it may concern:*

Be it known that we, WILLIAM JOHN STEWART and JOHN DANIEL McKINNON, of Inverness, in the Province of Nova Scotia, Canada, have invented certain new and useful Improvements in Center-Bearings for Cars, of which the following is a specification.

Our invention relates to improvements in center bearings, such as may be used for cars, carriages, engines or like purpose, and the objects of our invention are to provide a bearing which will be sensitive to unevenness in the road, whereby, the flange and rail wear will be reduced to a minimum and derailment become less liable, and the train rendered easier to haul.

Further objects are to provide such a bearing as will permit uniform distribution of the weight of the car when taking a curve and generally to provide an improved and more efficient form of center bearing better adapted to resist strain and perform the functions required of it.

In its construction, the invention includes two members, one of which is formed with a convex projection fitting into a concaved socket on the other member, said projection being formed with a series of annular grooves containing balls, the grooves being constructed to prevent outlet of the balls and having an inlet at one point through which the balls may be introduced, the convex projection being further formed at the center with a recess adapted to receive a projection on the opposite member, all as hereinafter more fully set forth and described in the accompanying specifications and drawings.

Figure 2:
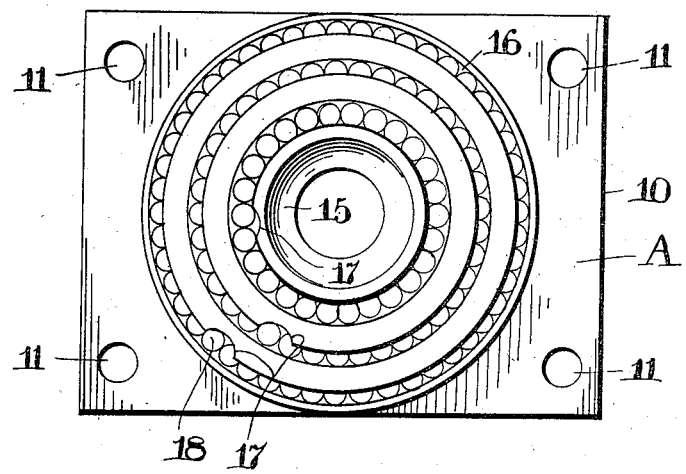
Figure 1:
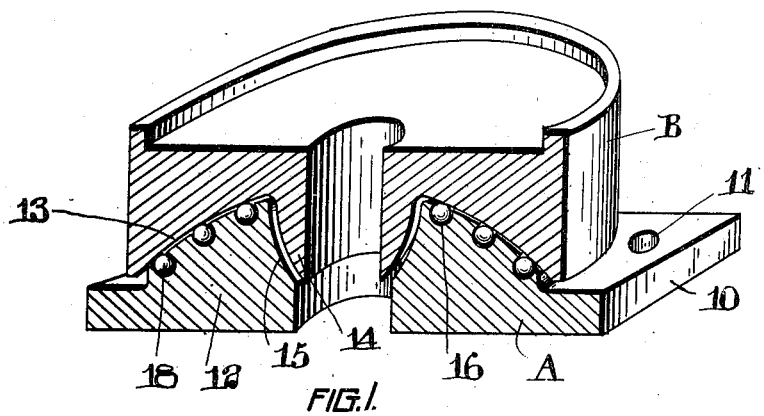

In the drawings: Figure 1 is a sectional, perspective view of the bearing. Fig. 2 is a plan view of the convex member.

In the drawings, like characters of reference indicate corresponding parts in each figure.

Referring to the drawings, A and B represent the two parts of the bearing which are connected respectively to the truck and car.

The member A which may be conveniently made in the form of a casting, is formed with a plate 10 having bolt holes 11 through which it may be attached to the part to which it is to be secured.

Integral with the plate is a convex projection 12 having a partially spherical outer surface adapted to fit into a corresponding surface which forms the wall of a concaved recess 13 on the member B, said member being provided at the center with a convex projection 14 entering a concave socket 15 on the member A.

To reduce friction between the two parts of the bearing, a plurality of ball raceways 16 are formed in the projection 12, said raceways being in the form of annular grooves having constricted openings adapted to normally retain the balls 18, said balls being adapted to be introduced into the grooves through suitable notches 17 provided at a determined point in the periphery of the groove.

The faces of the casting are shaped to fit closely together and will be suitably machined to provide a smooth wearing surface. The faces will also preferably be chilled in any well known way.

The convex shape of the projection 12 enables the strain to be uniformly distributed and centralized, thereby, providing a bearing which will permit free and easy movement of the two parts, and at the same time hold them in their relative position.

As many changes could be made in the above construction and many apparently widely different embodiments of my invention within the scope of the claims constructed without departing from the spirit or scope thereof, it is intended that all matter contained in the accompanying specifications and drawings shall be interpreted as illustrative and not in a limiting sense.

The projection 14 is adapted to at once prevent the entrance of dust between the members and assist in preventing lateral displacement of the upper member, the perforation in the projection being a center pin of usual form.

What we claim as our invention is:

1. A center bearing for cars comprising a lower member having an integral convex projection formed with a partially spherical outer face, the center of the projection being formed with a concave socket, and an upper member formed with a concave recess to fit the projection and a convex projection to fit the socket, said members being free to tilt with respect to each other and contacting only along the curved surfaces.

2. A center bearing for cars comprising a lower member having an integral convex projection formed with a partially spherical outer face, the center of the projection being formed with a concave socket, and an upper member formed with a concave recess to fit the projection and a convex projection to fit the socket, said members being free to tilt with respect to each other and contacting only along the curved surfaces, and one of said members being formed with grooves containing balls.

3. A center bearing for cars comprising a lower member having an integral convex projection formed with a partially spherical outer face, the center of the projection being formed with a concave socket, and an upper member formed with a concave recess to fit the projection and a convex projection to fit the socket, said members being free to tilt with respect to each other and contacting only along the curved surfaces, one of said members being formed with grooves containing balls and the other being formed with a series of concentric grooves having restricted openings adapted to permit the escape of the balls and being formed at one end with a notch to permit the introduction of the balls, in combination with the balls in the grooves.

4. A center bearing for cars comprising a lower member and an upper member having opposing curved bearing surfaces, a central projection on the upper member having a downwardly and inwardly curved face, and said lower member being provided with a central recess and a central opening, said recess having a downwardly and inwardly curved wall conforming to the curvature of and spaced from said central projection, whereby said upper member is free to tilt with respect to said lower member.

In witness whereof we have hereunto set our hands in the presence of two witnesses.

WILLIAM JOHN STEWART.
JOHN DANIEL McKINNON.

Witnesses:
 DANL. S. McNEIL,
 JEREMIAH PHILLIPS.